(12) United States Patent
Polumbus

(10) Patent No.: US 8,806,823 B2
(45) Date of Patent: Aug. 19, 2014

(54) CLOSURE STRIP

(75) Inventor: Mark D. Polumbus, Broken Arrow, OK (US)

(73) Assignee: Marco Industries, Inc., Tulsa, OK (US)

( * ) Notice: Subject to any disclaimer, the term of this patent is extended or adjusted under 35 U.S.C. 154(b) by 0 days.

(21) Appl. No.: 12/715,193

(22) Filed: Mar. 1, 2010

(65) Prior Publication Data

US 2011/0209433 A1   Sep. 1, 2011

Related U.S. Application Data

(60) Provisional application No. 61/308,786, filed on Feb. 26, 2010.

(51) Int. Cl.
*E04B 1/74* (2006.01)
*E04B 7/00* (2006.01)

(52) U.S. Cl.
USPC .......................................... 52/404.1; 52/198

(58) Field of Classification Search
CPC ....... E04D 1/00; E04D 13/176; E04D 13/174; E04D 1/36; E04D 1/365; E04D 13/17; E04D 13/172; F24F 7/02
USPC .......... 52/198, 199, 404.1, 359; 454/364–367
See application file for complete search history.

(56) References Cited

U.S. PATENT DOCUMENTS

| | | | | |
|---|---|---|---|---|
| 429,937 A | | 6/1890 | Mitchell | |
| 2,318,820 A | * | 5/1943 | Voigt et al. | 52/302.3 |
| 3,884,009 A | * | 5/1975 | Frohlich et al. | 52/745.06 |
| 3,949,657 A | * | 4/1976 | Sells | 454/365 |
| 4,024,685 A | * | 5/1977 | Aarons | 52/278 |
| 4,189,886 A | * | 2/1980 | Frohlich et al. | 52/302.1 |
| 4,280,399 A | * | 7/1981 | Cunning | 454/365 |
| 4,325,290 A | * | 4/1982 | Wolfert | 454/365 |
| 4,558,637 A | * | 12/1985 | Mason | 454/365 |
| 4,570,396 A | * | 2/1986 | Struben | 52/90.2 |
| 4,598,505 A | * | 7/1986 | McGown | 52/58 |
| 4,754,589 A | * | 7/1988 | Leth | 52/538 |
| 4,843,953 A | * | 7/1989 | Sells | 454/365 |
| 4,876,950 A | * | 10/1989 | Rudeen | 454/365 |
| 4,924,761 A | * | 5/1990 | MacLeod et al. | 454/365 |
| 4,957,037 A | * | 9/1990 | Tubbesing et al. | 454/366 |
| 4,995,308 A | * | 2/1991 | Waggoner | 454/260 |
| 5,002,816 A | * | 3/1991 | Hofmann et al. | 428/138 |

(Continued)

FOREIGN PATENT DOCUMENTS

JP    07-109797 A    4/1995
JP    07157960       6/1995

(Continued)

OTHER PUBLICATIONS

First Office Action dated Jun. 12, 2012, CA Application No. 2,718,316, 4 pages.

(Continued)

*Primary Examiner* — Mark Wendell
(74) *Attorney, Agent, or Firm* — Dorsey & Whitney LLP

(57) ABSTRACT

A sealing component is disclosed that is installed across an uneven surface without having dedicated segments for engaging raised and recessed portions of the uneven surface. The sealing component may include an elongated strip of compressible nonwoven material. The elongated strip may include an adhesive on one or two sides. In a pre-installation configuration, the strip may be wound into a coil.

19 Claims, 5 Drawing Sheets

(56) References Cited

U.S. PATENT DOCUMENTS

| | | | |
|---|---|---|---|
| 5,009,149 A * | 4/1991 | MacLeod et al. | 454/365 |
| 5,022,203 A * | 6/1991 | Boyd | 52/199 |
| 5,060,431 A * | 10/1991 | MacLeod et al. | 52/199 |
| 5,092,225 A * | 3/1992 | Sells | 454/365 |
| 5,095,810 A * | 3/1992 | Robinson | 454/365 |
| 5,122,095 A * | 6/1992 | Wolfert | 454/365 |
| 5,167,579 A * | 12/1992 | Rotter | 454/365 |
| 5,174,076 A | 12/1992 | Schiedegger et al. | |
| 5,288,269 A | 2/1994 | Hansen | |
| 5,304,095 A | 4/1994 | Morris | |
| 5,326,318 A | 7/1994 | Rotter | |
| 5,328,407 A | 7/1994 | Sells | |
| 5,331,783 A | 7/1994 | Kasner et al. | |
| 5,332,393 A | 7/1994 | Godl | |
| 5,352,154 A | 10/1994 | Rotter et al. | |
| 5,353,154 A | 10/1994 | Lutz et al. | |
| 5,425,672 A | 6/1995 | Rotter | |
| 5,427,571 A | 6/1995 | Sells | |
| 5,439,417 A | 8/1995 | Sells | |
| 5,458,538 A | 10/1995 | MacLeod et al. | |
| 5,473,847 A | 12/1995 | Crookston | |
| 5,542,882 A | 8/1996 | Sells | |
| 5,561,953 A | 10/1996 | Rotter | |
| 5,603,657 A | 2/1997 | Sells | |
| 5,816,014 A | 10/1998 | Tzeng et al. | |
| 5,826,383 A | 10/1998 | Garrison | |
| 5,921,863 A | 7/1999 | Sells | |
| 6,079,166 A * | 6/2000 | Mason et al. | 52/198 |
| 6,125,602 A | 10/2000 | Freiborg et al. | |
| 6,298,613 B1 | 10/2001 | Coulton et al. | |
| 6,308,472 B1 | 10/2001 | Coulton et al. | |
| 6,418,678 B2 | 7/2002 | Rotter | |
| 6,450,882 B1 | 9/2002 | Morris et al. | |
| 6,491,581 B1 | 12/2002 | Mankowski | |
| 6,599,184 B2 * | 7/2003 | Morris | 454/365 |
| 6,662,510 B2 * | 12/2003 | Rotter | 52/199 |
| 6,773,342 B2 | 8/2004 | Rotter | |
| 6,780,099 B1 * | 8/2004 | Harper | 454/186 |
| 7,594,363 B2 | 9/2009 | Polumbus et al. | |
| 8,024,897 B2 * | 9/2011 | Polumbus et al. | 52/199 |
| 8,083,576 B2 * | 12/2011 | Rotter | 454/365 |
| 2002/0032000 A1 | 3/2002 | Lawless, III et al. | |
| 2003/0022618 A1 | 1/2003 | Miller | |
| 2003/0051419 A1 | 3/2003 | Suzuki | |
| 2003/0077999 A1 | 4/2003 | Mankowski | |
| 2004/0137185 A1 | 7/2004 | Sieber et al. | |
| 2005/0106360 A1 | 5/2005 | Johnston et al. | |
| 2005/0241248 A1 | 11/2005 | Ridenour | |
| 2007/0072539 A1 | 3/2007 | Sells | |
| 2007/0093197 A1 * | 4/2007 | Shah | 454/365 |
| 2008/0220714 A1 | 9/2008 | Caruso | |

FOREIGN PATENT DOCUMENTS

| | | |
|---|---|---|
| JP | 07-109797 | 8/1995 |
| WO | 95/21975 | 8/1995 |
| WO | 95-21975 A1 | 8/1995 |
| WO | 97/32940 | 9/1997 |
| WO | 02/092930 | 11/2002 |

OTHER PUBLICATIONS

International Search Report and Writte Opinion issued in PCT application No. PCT/US2011/026550 dated Nov. 1, 2011, 9 pages.

Canadian Office Action dated Mar. 21, 2013, CA Application No. 2,718,316, 5 pages.

European Search Report dated Jun. 24, 2013, EP Application No. 11748245.5, 8 pages.

Supplementary European Search Report dated Jul. 7, 2013, EP Application No. 11748245.5, 11 pages.

* cited by examiner

CLOSURE STRIP

CROSS REFERENCE TO RELATED APPLICATION

The present application claims the benefit under 35 U.S.C. §119(e) to U.S. Provisional Patent Application No. 61/308,786 ("the '786 application"), which was filed on Feb. 26, 2010, and entitled "Closure Strip". The '786 application is incorporated by reference into the present application in its entirety.

TECHNICAL FIELD

Embodiments discussed herein are directed to closure strips used to provide ventilation in roofs or other building components.

BACKGROUND

Venting material may be used in connection with some roofing systems. In some configurations, venting material may be installed to provide a seal between roof panels, such that air is allowed to pass between the roof panels. Typically, one or more of the roof panels will have an uneven surface containing one or more raised portions and one or more recessed portions. Typically, venting materials are precut to fit a specific roof profile. Specifically, the venting materials may include a number of cuts or pockets that are adapted to engage a particular raised portions of a roof panel.

Due to this aspect of venting materials, the dimensions of the roof profile must typically be measured or known prior to the specific material being ordered or purchased. Once these measurements are acquired, the appropriate size of venting material may be ordered from a vendor. Provided no errors are made in the measurements or other steps of the ordering process, a vent of the appropriate size may be installed for the specified roof profile.

SUMMARY

Embodiments discussed herein are directed to sealing component that is installed across an uneven surface without having dedicated segments for engaging raised and recessed portions of the uneven surface. The sealing component may include an elongated strip of a lofted, compressible nonwoven material. The elongated strip may include an adhesive on one or two sides. In a pre-installation configuration, the strip may be wound into a coil.

One embodiment is directed to a ventilation system component, having an elongated strip of air-permeable compressible nonwoven fibers and an adhesive layer disposed on at least one side of the elongated strip. The fibers may be polyester, nylon, polyethylene, polypropylene, or any other natural or man-made fiber.

One embodiment is directed to a method of installing a ventilation system component, comprising: applying an elongated strip of nonwoven material to a major roof panel, the elongated strip of nonwoven material conforms to one or more irregularities on the surface of the major roof panel; and attaching a minor roof panel to the major roof panel, wherein a portion of the minor roof panel is in contact with the elongated strip of nonwoven material.

One embodiment is directed to a method of installing a ventilation system component, comprising: applying an elongated strip of nonwoven material to a minor roof panel; and attaching the minor roof panel to a major roof panel, wherein a portion of the major roof panel is in contact with the elongated strip of nonwoven material, the elongated strip of nonwoven material conforms to one or more irregularities on the surface of the major roof panel.

DETAILED DESCRIPTION

Embodiments discussed herein are directed to an apparatus or component for providing ventilation in roof. The apparatus or component may be a sealing component that includes an elongated strip of compressible nonwoven material. The elongated strip of compressible nonwoven material may be installed between roof panels. The elongated strip of compressible nonwoven material will provide a seal between the roof panels that facilitates ventilation, by allowing air to pass through. The nonwoven material strip may be used in an intake or exhaust area of a ventilation system. In this way, the nonwoven material strip allows air to pass between the exterior and the interior of a house or other building. The elongated strip of compressible nonwoven material may be installed without the use of dedicated segments that are adapted to fit a specific roof profile.

Figure 1:
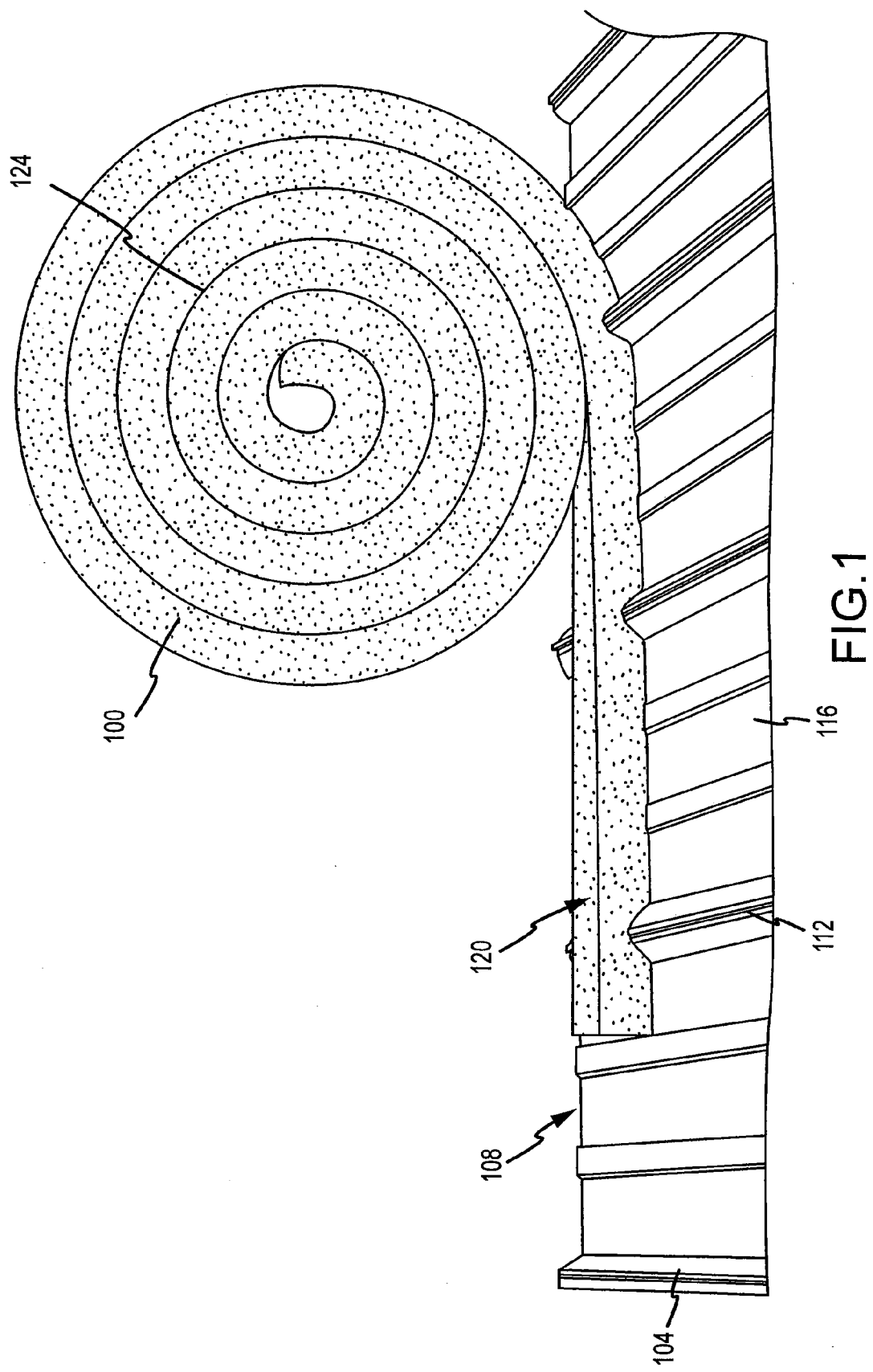
FIG. 1 is an illustration of an elongated strip in accordance with embodiments discussed herein.

As shown in FIG. 1, a strip 100 in accordance with embodiments discussed herein may be installed along a roof panel 104 having an uneven surface 108. By way of example and not limitation, the roof panel 104 may be a corrugated sheet. The strip 100 may be installed across both raised 112 and recessed 116 portions of the uneven surface 108. Across the raised portions 112, the strip 100 compresses and forms around the surface 108. Across the recessed portions 116, the strip 100 may expand or remain the same size to keep in contact with the surface 108. In this way, continuous contact is maintained between the strip 100 and both raised 112 and recessed 116 portions of the uneven surface 108. This continuous contact is maintained without dividing the strip 100 into separate segments that are dedicated to engaging different portions of an uneven surface 108.

The physical properties of the strip 100 provide the strip 100 with the ability to compress and/or form around irregularities on the uneven surface 108. In one embodiment, the strip 100 is formed from a plurality of polyester, nylon, polyethylene, polypropylene, or other man-made or natural fibers. The polyester, nylon, polyethylene, polypropylene, or other man-made or natural fibers provide the strip 100 with the ability to conform to a specific roof profile by compressing around raised portion of the roof and/or expanding or remaining the same size to keep in contact with recessed portions of the roof. Unlike polyurethane fibers used in prior art materials, the polyester fibers of the present embodiment do not wick moisture into the interior or other portions of the strip 100. The polyester fibers of the strip 100 may be coated in a rubber base material. The rubber base material may provide fire proofing to the strip 100, in one embodiment. In one embodiment, the strip 100 is manufactured as a single baffled layer of non-woven material coated with a phenolic resin component. In one embodiment, the strip 100 has a net free area or 20 square inches per linear foot of material.

As shown in FIG. 1, the strip 100 may be wound into a coil for packaging and delivery. One side of the strip may include an adhesive substance 120, such as glue. The adhesive substance 120 may be arranged on the surface of the strip 100 in a single or double bead layer. In one embodiment, the adhesive substance 120 is a M63 hot melt adhesive. The adhesive substance 120 may be applied on one or two sides of the strip 120. In use, the adhesive substance 120 provides a mechanism for the strip 120 to be attached to a particular surface. Specifically, the strip 100 may be unwound from its coiled orientation and progressively applied to a desired location on a roof panel or other surface. The adhesive substance 120 is adapted to form a tight seal between the strip 100 and a particular surface, even when installed in bad weather conditions. The strip 100 may be wound together with an elongated paper 124 or other material that prevents the adhesive substance 120 from adhering to an adjacent side of the strip 100.

Figure 2:
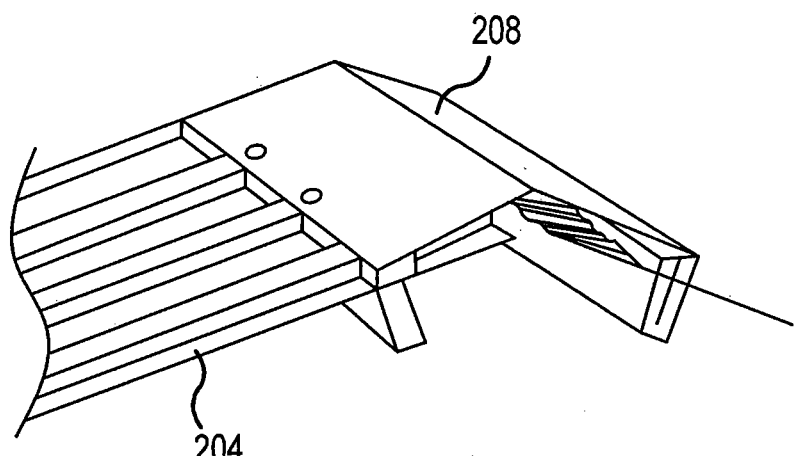
FIG. 2 is an illustration of an elongated strip installed in connection with a ridge cap.

As shown in FIG. 2, the strip 100 may be installed between major and minor roof panels in a ridge portion of a roof. Specifically, the strip 100 may be deployed as a seal between a corrugated sheet 204 (major roof panel) and a ridge cap 208 (minor roof panel). The strip 100 provides a tight seal between the uneven surface of corrugated sheet 204 and the ridge cap 208. The nonwoven material that makes-up the strip 100 allows for air to pass through the strip 100, thereby allowing ventilation to occur between the corrugated sheet 204 and the ridge cap 208.

The strip 100 may be installed at an intake or an exhaust portion of a roof ventilation system, such as the ridge cap location shown in FIG. 2. The use of polyester or other fibers in the strip 100 prevents water or moisture from being wicked into the strip 100. By preventing moisture from accumulating in the strip 100, the strip 100 is prevented from freezing. If the strip 100 were allowed to freeze, it could lose its air-permeability and cease to function as a ventilation component. In connection with the roof cap installation shown in FIG. 2, the strip 100 may be adapted to provide a low profile or an otherwise inconspicuous appearance. In particular, the strip 100 may include a grey color. In one embodiment, the strip 100 may be sized to seal an approximate one to two-inch gap between the corrugated sheet 204 and the ridge cap 208. Specifically, the strip 100 may have an inch and one-half of nominal thickness, three inches of width and a twenty foot length.

Figure 3:
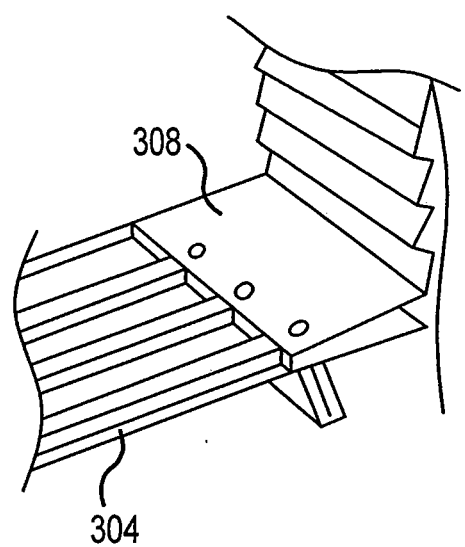
FIG. 3 is an illustration of an elongated strip installed in connection with a wall cap.

In addition to being used in connection with a ridge cap, the strip 100 may be used in connection with other roof portions or joints as shown in FIG. 3. The strip 100 may be deployed as a seal between a corrugated sheet 304 and a wall cap 308. As used herein, a "wall cap" refers to a minor roof panel which is disposed between a major roof panel and a wall 312 of a house or other building. In the wall cap installation shown in FIG. 3, the strip 100 may form a tight seal between the corrugated sheet 304 and the wall cap 308. The permeability of the strip 100 may allow air or other gas to pass from the exterior of the house to and/or from the interior of house between the corrugated sheet 304 and the wall cap 308.

Figure 4:
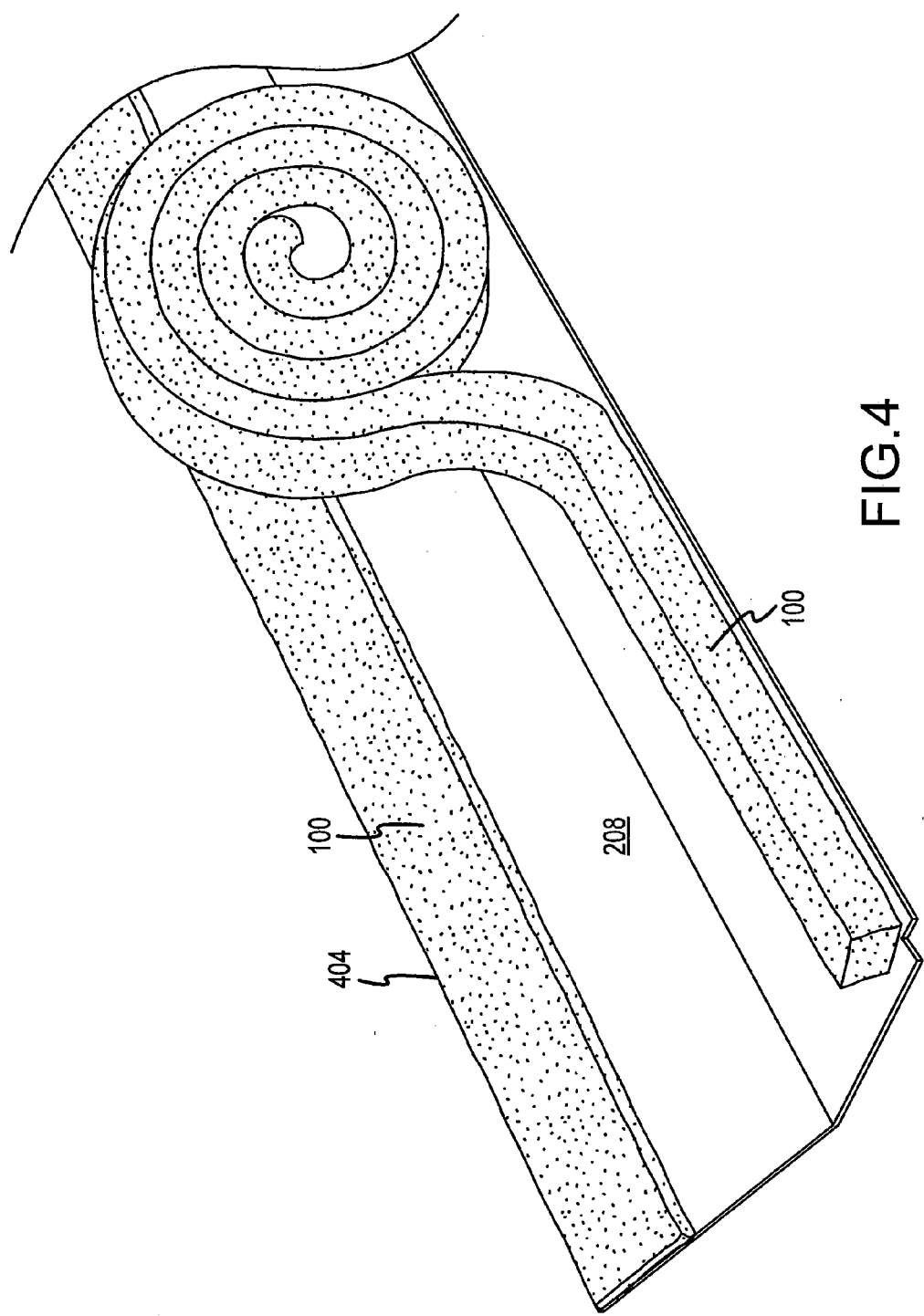
FIG. 4 is an illustration of an installation procedure in connection with an inverted ridge cap.
Figure 5:
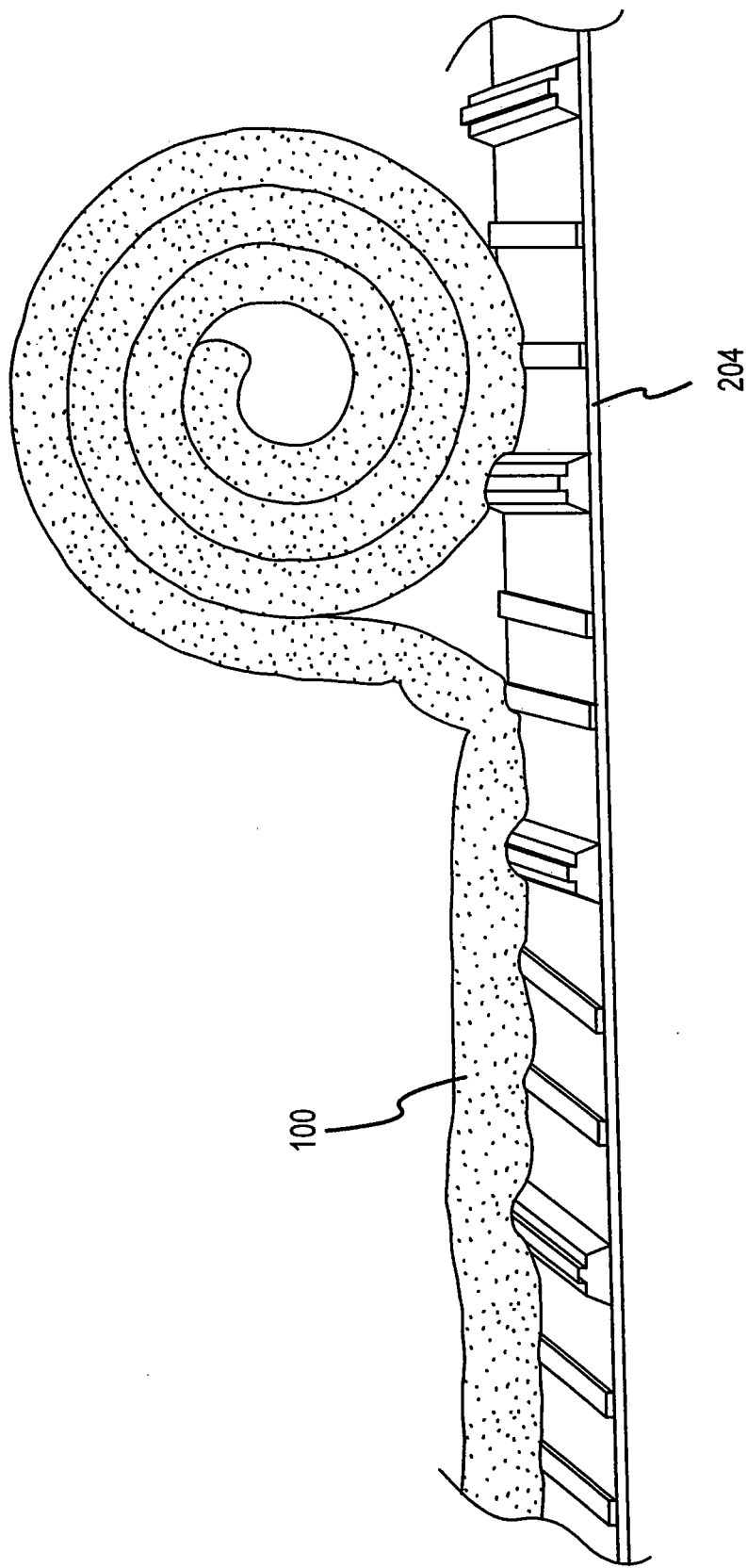
FIG. 5 is an illustration of an installation procedure in connection with a major roof panel.

In an installation process, the strip 100 may be unrolled and attached to a portion of either the major or minor roof panels by use of the adhesive 120, which is applied to the surface of the strip 100. By way of example and not limitation, FIG. 4 and FIG. 5 show an installation of the strip 100 in connection with a ridge cap system. FIG. 4 shows an illustration of an installation of the strip 100 on the underside of a ridge cap. Alternatively, the strip 100 may be installed on the surface of the roof panel or major roof panel 204 as shown in FIG. 5.

FIG. 4 is an illustration of the underside of a ridge cap 208. During an installation process, the ridge cap 208 may be inverted and placed on the ground or other surface. In this orientation, one or more strips 100 may be unrolled and attached to the underside of the inverted ridge cap 208. As shown in FIG. 4, a strip 100 may be attached by use of the adhesive substance 120 to a portion of the underside of the inverted ridge cap 208 that is proximate to an edge of the ridge cap 208. With the strip 100 installed or attached as shown in FIG. 4, the ridge cap 208 may be maneuvered into place at the appropriate location on the top of the roof. With the ridge cap installed at appropriate location, the strip 100 may form to fit irregularities or uneven portions of a surface of a major roof panel. The strip 100 may include an adhesive 120 that attaches the strip 100 to the major roof panel. Alternatively, the seal to the roof may be achieved through the use of adhesive between the strip and the roof cap only.

FIG. 5 is an illustration of an installation of strip 100 on a major roof panel. Specifically, the strip 100 is unrolled with the adhesive substance 120 facing downward. The strip 100 is thereby attached or connected to the major roof panel 204. The strip 100 may be applied to the major roof panel 204 corresponding to a location that will overlap with a ridge cap 208 when the ridge cap 208 is installed at its appropriate location. Alternatively, the strip 100 may be installed at a slightly upslope location from an edge of the ridge cap 208 when the ridge cap 208 is installed at its appropriate location.

Whether the strip 100 is initially installed on the major or minor roof panels, the minor roof panel may be secured to the major roof panel using an appropriate tool. In one embodiment, a 3300 RPM screw gun may be used. The strip 100 is adapted for easy installation. Specifically, a utility knife or scissors may be used to cut the strip to ensure the strip 100 conforms to the desired length. The strip 100 may be caulked without a connector or end plugs. Multiple strips 100 may be used in combination to form a ventilation strip of any size. Adjacent strips 100 may be "butt-fit" such that end portions of the strips are in contact.

Figure 6:
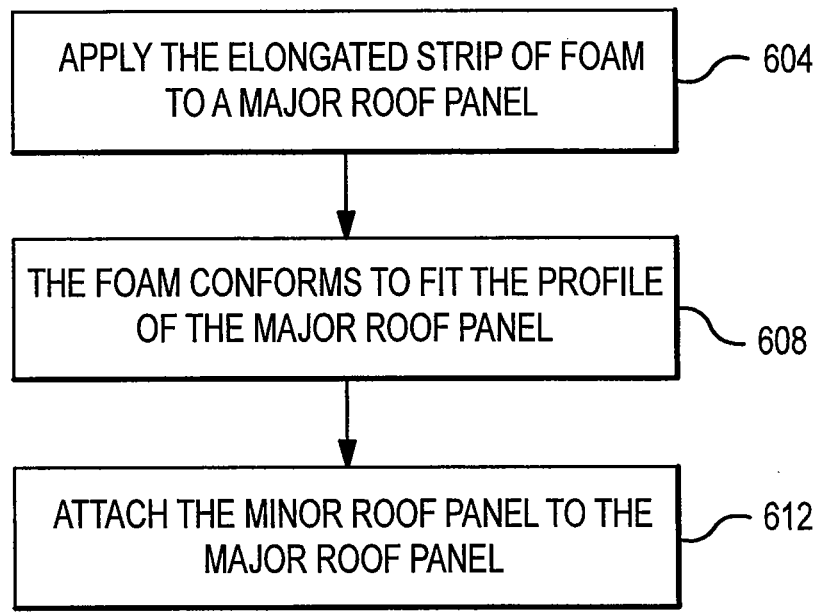
FIG. 6 is a flow chart illustrating a method in accordance with embodiments discussed herein.

Turning now to a method of installing a strip 100 in accordance with implementations discussed herein, references is made to the flow chart shown in FIG. 6 Initially, at step 604, the strip 100 is applied to a major roof panel. An example of this installation is shown in FIG. 5. Next, in operation 608, the nonwoven material that makes up the elongated strip 100 conforms to fit the profile of the major roof panel. Specifically, the nonwoven material may compresses around raised portions of a roof panel. The nonwoven material may expand or remain the same size to keep in contact with the recessed portions of the major roof panel. Following operation 608, operation 612 may follow. In operation 612, a minor roof panel may be attached to the major roof panel. The elongated strip 100 may provide a seal between the major and minor roof panels. Examples of this installation configuration are shown in FIG. 2 and FIG. 3.

Figure 7:
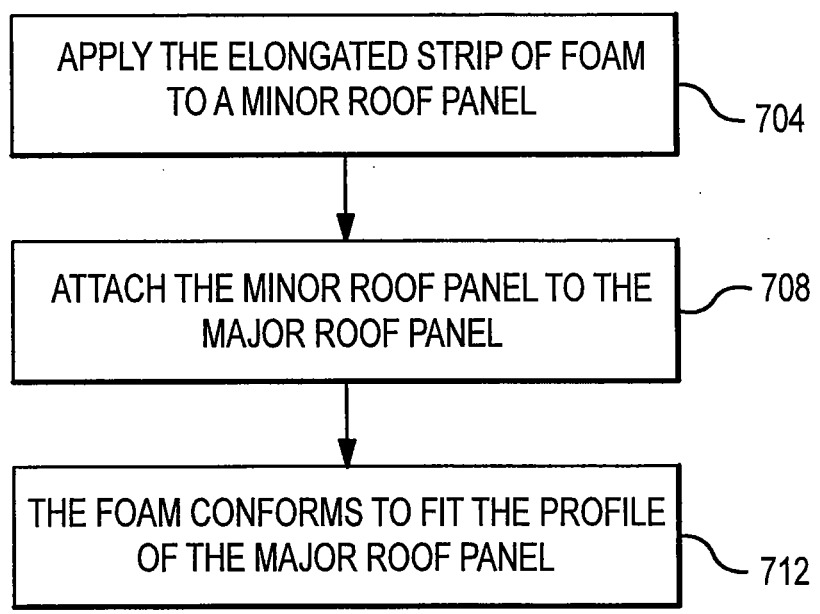
FIG. 7 is a flow chart illustrating another method in accordance with embodiments discussed herein.

FIG. 7 is a flow chart showing steps in a method in accordance implementation discussed herein. Initially, at step 704, an elongated strip 100 of nonwoven material is applied to a minor roof panel. This may be, for example, a ridge cap or wall cap. A ridge cap application of an elongated strip is shown by way of example and not limitation in FIG. 4. Specifically, the elongated strip or strips may be applied proximate to the edge of the roof cap or other minor roof panel as the roof cap is placed in an inverted orientation. Following operation 704, operation 708 may follow. In operation 708, the minor roof panel may be attached to the major roof panel. Following operation 708, operation 712 may occur. In operation 712, the material which makes-up the elongated strip may conform to fit the profile of the major roof panel. Specifically, the nonwoven material may expand, contract or remain the same size to fit recessed or raised portions of the major roof panel. By conforming to the irregularities of the major roof panel, the strip may provide a seal between the major and minor roof panels.

By way of example and not limitation, the embodiments illustrated herein include a minor roof panel having a smooth surface and major roof panel having an uneven surface. It should be appreciated that other roof configurations may be used in connection with the strip 100. Specifically, the strip 100 may be installed with a minor roof panel having an uneven surface and a major roof panel having a smooth surface.

The foregoing merely illustrates certain principles of particular embodiments. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

The invention claimed is:

1. A ventilation system component for use with a roof panel having an uneven surface, comprising:
    an elongated strip of air-permeable compressible nonwoven material formed from a plurality of fibers, said plurality of fibers comprising polyester, nylon, polyethylene, or polypropylene fibers, said strip having a first side opposite a second side, each side having a substantially continuous planar surface and the strip having a substantially constant cross-section of the material from a top of the strip downward when the strip is not in use and one of the first side or the second side being conformable to and in substantially continuous engagement with the roof panel having an uneven surface without having dedicated segments to engage the uneven surface and the other of the first side or the second side in substantially continuous engagement with an opposing roof panel when the strip is in use; and
    an adhesive layer disposed on at least one side of the elongated strip of air-permeable compressible nonwoven material.

2. The ventilation system component of claim 1, wherein the adhesive layer includes M63 hot melt adhesive.

3. The ventilation system component of claim 1, wherein the adhesive layer is a double beaded layer.

4. The ventilation system component of claim 1, wherein the plurality of fibers comprises polyester fibers and the polyester fibers are coated in a rubber base material.

5. The ventilation system component of claim 4, wherein the rubber base material is a fire retardant.

6. The ventilation system component of claim 1, wherein the elongated strip of air-permeable compressible nonwoven material is shaped as a coil for packaging.

7. The ventilation system component of claim 6, further comprising:
    an elongated paper strip in contact with the adhesive, wherein the elongated paper strip prevents the adhesive from adhering to an adjacent surface of the elongated strip of air-permeable compressible nonwoven material when the elongated strip of air-permeable compressible material is rolled into a coil for packaging.

8. The ventilation system component of claim 1, wherein the plurality of fibers comprises polyester fibers and the polyester fibers are moisture resistant.

9. The ventilation system component of claim 1, wherein the elongated strip of air-permeable compressible nonwoven material is a single-baffled-layer coated with a phenolic resin.

10. The ventilation system component of claim 1, wherein the elongated strip of air-permeable compressible nonwoven material measures 10 feet by 3 inches by 1.5 inches.

11. A method of installing a ventilation system component, comprising:
    applying an elongated strip of compressible air permeable nonwoven material to a major roof panel, the elongated strip of nonwoven material having a first side opposite a second side, each side having a substantially continuous planar surface and the strip having a substantially constant cross-section of the material from a top of the strip downward when the strip is not in use and one of the first side or the second side conforming to and in substantially continuous engagement with one or more irregularities on the surface of the major roof panel without having dedicated segments to engage the irregularities and the other of the first side or the second side in substantially continuous engagement with a minor roof panel when the strip is in use; and
    attaching the minor roof panel to the major roof panel, wherein a portion of the minor roof panel is in contact with the elongated strip of nonwoven material.

12. The method of claim 11, wherein applying the elongated strip of nonwoven material includes applying the elongated strip of nonwoven material at a location on the major roof panel that is slightly up slope from an edge of a minor roof panel when the minor roof panel is attached to the major roof panel.

13. The method of claim 11, wherein the minor roof panel is a ridge cap, the method further comprising:
    attaching the ridge cap to the major roof panel and a second major roof panel that is adjacent to the major roof panel.

14. The method of claim 11, wherein the minor roof panel is a wall-cap, the method further comprising:
    attaching the wall-cap to the major roof panel at a location on the major roof panel that is adjacent to a wall.

15. A method of installing a ventilation system component, comprising:
    applying a first elongated strip of compressible air permeable nonwoven material to a minor roof panel; and
    attaching the minor roof panel to a major roof panel, wherein a portion of the major roof panel is in contact with the first elongated strip, wherein the first elongated strip has a first side opposite a second side, each side having a substantially continuous planar surface and the strip having a substantially constant cross-section of the material from a top of the strip downward when the strip is not in use and one of the first side or the second side substantially conforms to and is in substantially continuous contact with one or more irregularities on the surface of the major roof panel without having dedicated segments to engage the irregularities and the other of the first side or the second side is in substantially continuous contact with the minor roof panel when the strip is in use.

16. The method of claim 15, wherein the minor roof panel is a ridge cap, the method further comprising:
   inverting the ridge cap;
   applying the first elongated strip adjacent to a first edge of the ridge cap;
   applying a second elongated strip of compressible, air permeable nonwoven material adjacent to a second edge of the ridge cap, said strip having a first side opposite a second side, each side having a substantially continuous planar surface and the strip having a substantially constant cross-section of the material from a top of the strip downward when the strip is not in use and one of the first side or the second side being conformable to and in substantially continuous contact with a second major roof panel and the other of the first side and the second side in substantially continuous contact with the ridge cap when the strip is in use; and
   attaching the ridge cap to the major roof panel and to the second major roof panel that is adjacent to the major roof panel.

17. The method of claim 15, wherein the minor roof panel is a wall-cap, the method further comprising:
   inverting the wall-cap;
   applying the first elongated strip adjacent to a first edge of the wall cap; and
   attaching the wall-cap to the major roof panel at a location on the major roof panel that is adjacent to a wall.

18. The method of claim 15, wherein the first elongated strip is applied to the minor roof panel adjacent to an edge of the minor roof panel, the edge of the minor roof panel being longer than a length of the first elongated strip, the method further comprising:
   applying a second elongated strip of compressible air permeable nonwoven material to the minor roof panel adjacent to the edge of the minor roof panel, including butt-fitting the second elongated strip of nonwoven material to the first elongated strip, said strip having a first side opposite a second side, each side having a substantially continuous planar surface and the strip having a substantially constant cross-section of the material from a top of the strip downward when the strip is not in use and one of the first side or the second side being conformable to and in substantially continuous contact with the major roof panel and the other of the first side and the second side in substantially continuous contact with the minor roof panel when the strip is in use.

19. The method of claim 15, wherein the first elongated strip is applied to the minor roof panel adjacent to an edge of the minor roof panel, the edge of the minor roof panel being shorter than a length of the first elongated strip, the method further comprising:
   cutting the first elongated strip such that its length corresponds to a length of the edge of the minor roof panel.

* * * * *